US006125994A

United States Patent [19]

Todome

[11] Patent Number: 6,125,994

[45] Date of Patent: *Oct. 3, 2000

[54] IMAGE FORMING APPARATUS AND A BELT CONVEYOR SYSTEM

[75] Inventor: Tsuyoshi Todome, Kawasaki, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/151,282

[22] Filed: Sep. 11, 1998

[30] Foreign Application Priority Data

Sep. 12, 1997 [JP] Japan .................................... 9-249102

[51] Int. Cl.[7] .......................... B65G 39/16; G03G 15/01; G03G 15/16

[52] U.S. Cl. .......................... 198/806; 399/303; 399/312

[58] Field of Search .................................... 399/165, 162, 399/312, 313, 303; 198/806, 813

[56] References Cited

U.S. PATENT DOCUMENTS

| | | | |
|---|---|---|---|
| 3,715,027 | 2/1973 | Fujimoto | 198/806 |
| 4,084,683 | 4/1978 | Moss | 198/806 X |
| 4,170,175 | 10/1979 | Conlon, Jr. | 198/806 X |
| 4,367,031 | 1/1983 | Hamaker | 399/165 |
| 5,481,338 | 1/1996 | Todome . | |
| 5,619,310 | 4/1997 | Todome | 198/806 X |
| 5,740,511 | 4/1998 | Todome | 399/303 |

OTHER PUBLICATIONS

Shinichi Enomoto, "Low Heat Expansion Cast Iron (NOBNITE)", "Casting", vol. 61 (1989), pp. 628–631.

Shinichi Enomoto, "Iron/Nickel Alloy", Journal of Japan society for Precision Engineering, (1985), pp. 58–63.

*Primary Examiner*—Susan S.Y. Lee
*Attorney, Agent, or Firm*—Foley & Lardner

[57] ABSTRACT

A belt conveyor system has a rotatable first roller and a second roller tapered toward a first end thereof and located substantially parallel to and at a distance from the first roller. The system also has a conveyor belt passed around and stretched between the first and second rollers for endless traveling. The system further includes a regulating member located at a position close to a first end of the first roller, opposite the first end of the second roller. The regulating member is in sliding contact with an end side of the conveyor belt only in a region where the conveyor belt is in contact with the first roller.

6 Claims, 3 Drawing Sheets

IMAGE FORMING APPARATUS AND A BELT CONVEYOR SYSTEM

BACKGROUND OF THE INVENTION

The present invention relates to an image forming apparatus, in which developer images are formed on image carrying bodies, and a printed image is outputted by transferring the developer images to a transfer medium conveyed by means of a conveyor belt.

A quadruple-tandem color copying machine described in U.S. Pat. No. 5,481,338, for example, is known as an image forming apparatus for forming full-color images. The copying machine of this type comprises an endless conveyor belt for conveying recording sheets and four photoconductive drums arranged side by side along the belt.

Toner images of their own colors (yellow, magenta, cyan, and black) are formed on the photoconductive drum, individually, and successively transferred in layers to a recording sheet that is held on the conveyor belt. The transferred toner images are melted and fixed on the recording sheet, whereupon a color image is outputted.

However, the temperature in the image forming apparatus is likely to increase due to the heat generated at the time of fixing, and the structural components arranged inside the apparatus may thermally expand. This being so, it is very difficult to superpose the images of the four individual colors, yellow, magenta, cyan, and black, accurately on one another as they are transferred to the recording sheet, and therefore, to output high-quality images without color drifts or shifts.

BRIEF SUMMARY OF THE INVENTION

The present invention has been contrived in consideration of these circumstances, and an object of the invention is to provide an image forming apparatus capable of forming high-quality images without color shifts.

Another object of the invention is to provide a belt conveyor system in which a conveyor belt for conveying recording sheets can steadily travel in its regular position.

In order to achieve the above objects, an image forming apparatus according to the present invention comprises: a plurality of image carrying bodies; supporting means supporting the image carrying bodies at given intervals; charging means for charging the image carrying bodies, individually; exposure means for continuously deflecting a plurality of light beams corresponding to an image signal, and exposing and scanning the image carrying bodies charged by the charging means, thereby forming electrostatic latent images individually on the image carrying bodies; developing means for supplying a developer to the latent images formed individually on the image carrying bodies by the exposure means, thereby developing the latent images to form developer images on the image carrying bodies, individually; transportation means for transporting a transfer medium toward each of the image carrying bodies; transfer means for successively transferring the developer images formed on the image carrying bodies to the surface of the transfer medium transported by the transportation means; and fixing means located close to the downstream side of the transportation means in the direction of transportation of the transfer medium by the transportation means and designed to heat the developer images transferred to the surface of the transfer medium by the transfer means, to thereby fix the developer images to the transfer medium surface; at least one of the means including the supporting means, exposure means, and transportation means being formed of a metallic material consisting mainly of Fe, Ni, Co, C, and Si.

The transportation means, in particular, includes first and second rollers facing each other across a space and a conveyor belt passed around and stretched between the first and second rollers for endless traveling. The first roller, which is located close to the fixing means, is formed of a metallic material consisting mainly of Fe, Ni, Co, C, and Si.

Further, a belt conveyor system according to the invention comprises: a rotatable first roller; a second roller tapered toward one end thereof and located at a distance from the first roller; a conveyor belt passed around and stretched between the first and second rollers for endless traveling; and a regulating member located in sliding contact with an end side of the conveyor belt passed around the first roller, in a position close to one end of the first roller opposite to the tapered end of the second roller, the regulating member being in contact with the end side of the conveyor belt in the region where the conveyor belt is passed around the first roller.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

An embodiment of the present invention will now be described in detail with reference to the accompanying drawings.

Figure 1:
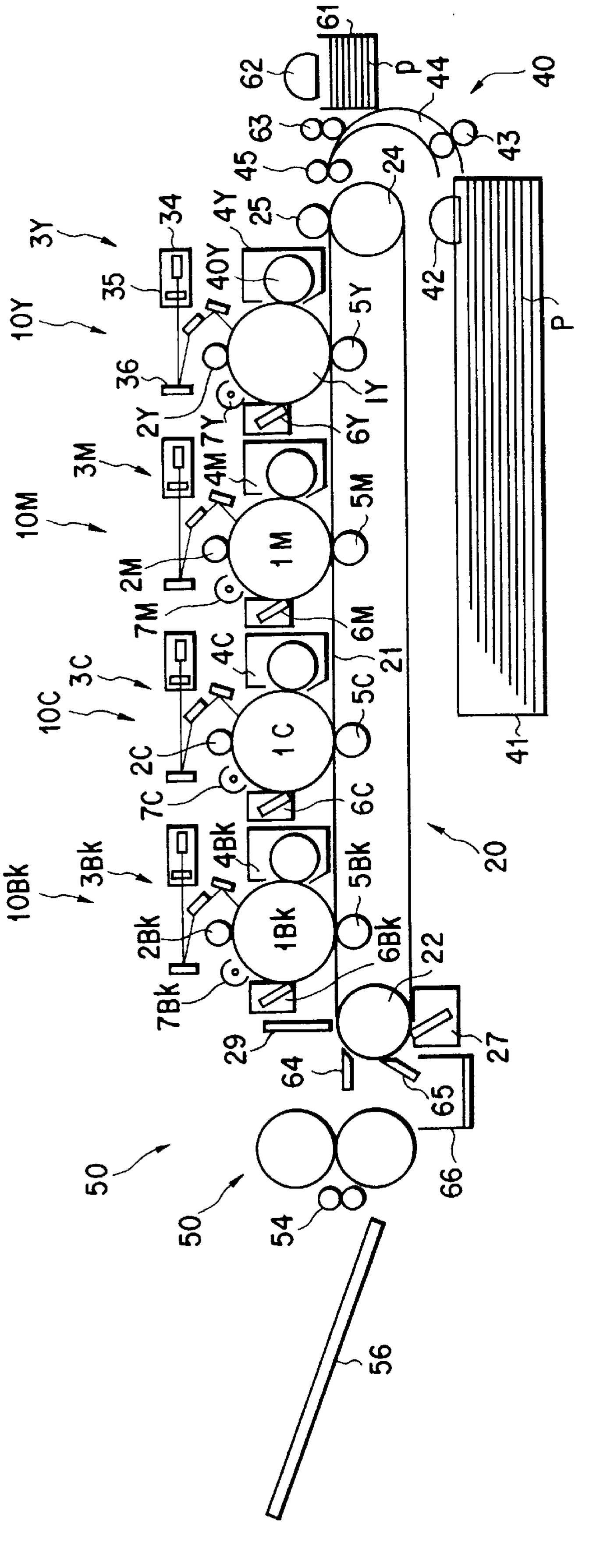
FIG. 1 a schematic view showing a color copying machine according to an embodiment of the present invention.

FIG. 1 schematically shows an arrangement of a quadruple-tandem full-color copying machine (hereinafter referred to simply as "copying machine") as an image forming apparatus according to the present embodiment of the invention. This copying machine comprises four sets of electrophotographic image forming sections 10Y, 10M, 10C and 10Bk for forming visible images of four colors, yellow, magenta, cyan, and black, respectively. The image forming sections 10Y, 10M, 10C and 10Bk are provided with photoconductive drums 1Y, 1M, 1C and 1Bk, respectively, which are arranged side by side at given distances from one another in a substantially horizontal direction.

Under the photoconductive drums 1Y, 1M, 1C and 1Bk extends a conveyor mechanism 20 for conveying recording sheets P, for use as transfer media, through the image forming sections 10Y, 10M, 10C and 10Bk. The conveyor mechanism 20 includes a driving roller 22 and a driven roller 24, which are spaced from each other, and a conveyor belt 21 passed around and stretched between the rollers 22 and 24. The conveyor belt 21 is run endlessly along the rotating direction of the drums 1Y, 1M, 1C and 1Bk.

The driven roller 24 is urged to separate from the driving roller 22 by means of springs 242*f* and 242*r* (FIG. 3), whereby a given tension is applied to the conveyor belt 21 between the rollers 22 and 24. The photoconductive drums 1Y, 1M, 1C and 1Bk are arranged on a conveying surface of the conveyor belt 21 in rolling contact with it.

The respective rotating shafts of the photoconductive drums 1Y, 1M, 1C and 1Bk and that of the driving roller 22 extend substantially parallel to one another in the same direction from the front side of the copying machine (obverse side of the drawing) toward the rear side (reverse side of the drawing). A pair of metallic support plates 12 are provided individually at the front and rear end portions of the respective rotating shafts of the photoconductive drums and the driving roller, thereby supporting the shafts for rotation. These support plates 12 are partially shown in FIG. 2. Thus, the photoconductive drums 1Y, 1M, 1C and 1Bk and the driving roller 22 are located in position by means of the two support plates 12, and the intervals between the drums are regulated also by means of the plates 12.

Further, an attraction roller 25 is provided at the right-hand end portion (FIG. 1) of the conveyor mechanism 20. The roller 25 is in rolling contact with the top portion of the driven roller 24 with the conveyor belt 21 between them. The roller 25 forms a given potential difference between itself and the driven roller 24 that is grounded, thereby causing each recording sheet P, run between the two rollers, to be attracted electrostatically to the surface of the belt 21.

Furthermore, a belt cleaner 27 is provided at the left-hand end portion (FIG. 1) of the conveyor mechanism 20. The cleaner 27 faces the driving roller 22 with the conveyor belt 21 between them. The belt cleaner 27 cleans the conveying surface of the belt 21 by scraping off undesired paper dust remaining on the belt 21, residual toner, and pattern images.

The following is a description of the construction of each of the image forming sections 10Y, 10M, 10C and 10Bk. Since the sections 10Y, 10M, 10C and 10Bk have substantially the same construction, the yellow image forming section 10Y on the uppermost-stream side, with respect to the conveying direction of the recording sheets P, will be described representatively.

The yellow image forming section 10Y is provided with the photoconductive drum 1Y for use as an image carrying body in its substantially central position. The drum 1Y is surrounded by a main charger 2Y, exposure unit 3Y, developing unit 4Y, transfer roller 5Y, cleaner 6Y, and discharge lamp 7Y, which are arranged in the order named in the rotating direction of the drum 1Y. The main charger 2Y charges the surface of the drum 1Y to a given potential. The exposure unit 3Y exposes the charged drum surface in accordance with a color-separated image signal, thereby forming an electrostatic latent image on the drum surface. The developing unit 4Y supplies a yellow toner, a developer, to the latent image on the drum surface, thereby developing the image. The transfer roller 5Y serves to transfer the developed toner image to the surface of each recording sheet P that is fed by means of a sheet feeding mechanism 40 (mentioned later). The cleaner 6Y is used to remove the residual toner that remains on the surface of the photoconductive drum 1Y without having been transferred. The discharge lamp 7Y removes electric charge remaining on the drum surface. The drum 1Y is rotated at a given peripheral speed by means of a drum drive motor (not shown).

Figure 2:
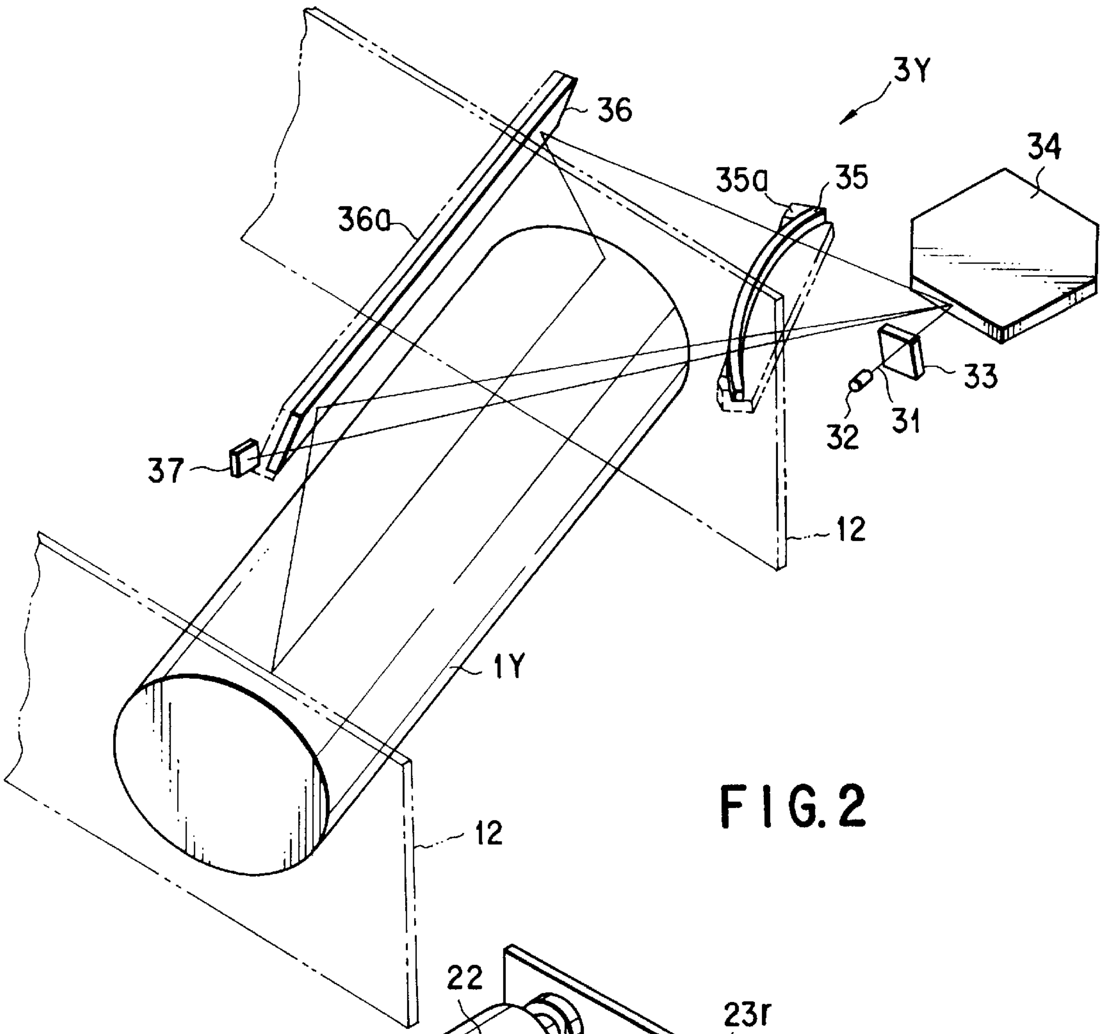
FIG. 2 is a perspective view schematically showing an exposure unit incorporated in the copying machine of FIG. 1.

FIG. 2 representatively shows an outline of the aforesaid yellow exposure unit 3Y. The exposure unit 3Y includes a semiconductor laser generator 32, which emits a laser beam 31 corresponding to a print signal delivered from a printing control section (not shown) in accordance with image data from an external apparatus (not shown) or the like. The laser beam 31 emitted from the generator 32 is shaped as it is passed through a cylindrical lens 33 for use as a beam shaping optical system, and is deflected by a polygon mirror 34 that is rotated at high speed (about 20,000 to 25,000 rpm) by means of a high-speed motor (not shown).

The laser beam 31 deflected by the polygon mirror 34 is transmitted through an fθ-lens 35 and reflected by a reflector mirror 36, whereupon it is applied to the surface of the photoconductive drum 1Y. Although a plurality of reflector mirrors 36 are arranged on an optical path that leads to the drum 1Y, only one of them is shown representatively in FIG. 2 for simplicity of illustration.

As the polygon mirror 36 rotates, the photoconductive drum 1Y is scanned with the laser beam 31 in a main scanning direction along its axis of rotation. As the drum 1Y itself rotates, it is scanned with the laser beam 31 in a sub-scanning direction at right angles to the main scanning direction. As the mirror 34 and the drum 1Y rotate in this manner, the whole drum surface is exposed and scanned in response to the print signal, whereupon a yellow electrostatic latent image is formed on the drum surface.

Part of the laser beam 31 deflected by the polygon mirror 36 is detected by means of a photodiode 37 for use as a beam detector. Based on the result of this detection, the write timings for the main scanning direction for the laser beams in the individual image forming sections are synchronized.

The fθ-lens 35 is held at a given angle in a given position by means of a metallic lens holding member 35*a*. The reflector mirror 36, which is located on the downstream side of the lens 35, is held at a given angle in a given position by means of a metallic mirror holding member 36*a*. In general, the mirror 36 is located relatively close to the photoconductive drum 1Y, while the fθ-lens 35, along with the polygon mirror 36, is incorporated in one closed unit for higher positioning accuracy.

The following is a description of the operation of the copying machine described above. Since the image forming sections 10Y, 10M, 10C and 10Bk operate substantially in the same manner, only the operation of the yellow image forming section 10Y will be described representatively.

The laser beam is applied through the exposure unit 3Y to the surface of the photoconductive drum 1Y charged by the main charger 2Y, whereupon the yellow electrostatic latent image is formed on the drum surface. This latent image is passed through the developing unit 4Y as the drum 1Y rotates, and is developed with the yellow toner fed through a developing sleeve 40Y. As the drum 1Y rotates, the developed yellow toner image is moved to a transfer position in which the transfer roller 5Y faces the drum 1Y.

On the other hand, the recording sheets P stored in a sheet cassette 41 are fed by means of the sheet feeding mechanism 40. Each sheet P is taken out by means of a pickup roller 42 that adjoins one end of the cassette 41, and is fed to a sheet conveying path 44 by means of feed rollers 43. The sheet P conveyed along the path 44 is aligned by means of aligning rollers 45 that are provided at the terminal end of the path 44, that is, on the path on the upper-stream side the conveyor mechanism 20. Thereafter, the sheet P is transported between the driven roller 24 and the attraction roller 25 and fed to the aforesaid transfer position along the conveyor belt 21.

When the yellow toner image on the drum surface and the recording sheet P are moved or transported to the transfer position in this manner, a given transfer bias voltage is applied to the transfer roller 5Y. Thereupon, an electric field directed to the roller 5Y is applied to the yellow toner, so that the yellow toner image on the drum surface is transferred to the recording sheet P. Transfer bias voltages applied to the transfer rollers 5M, 5C and 5Bk, which are arranged in the magenta image forming section 10M and the subsequent image forming sections, are set so that they increase with distance from the section 10M.

After the yellow toner image is transfer to the recording sheet P, the photoconductive drum 1Y is rotated at the given peripheral speed as it is, and the residual toner and paper dust are removed by means of the cleaner 6Y. If necessary, a series of processes that begins at the main charger 2Y is started again thereafter.

The recording sheet P, having the yellow toner image thus transferred thereto, is transported through the magenta, cyan, and black image forming sections 10M, 10C and 10Bk in succession by means of the conveyor belt 21, whereupon toner images of their own colors are transferred in layers.

The magenta, cyan, and black image forming sections 10M, 10C and 10Bk function substantially in the same manner as the yellow image forming section 10Y described above. Therefore, like portions of these sections are designated by like reference numerals to which M (magenta), C (cyan), and Bk (black) are attached in place of Y (yellow), and a detailed description of those portions is omitted.

The recording sheet P, having the toner images of all the colors transferred in layers thereto, is fed into a fixing unit 50 that is located close to the downstream side of the conveyor mechanism 20.

The fixing unit 50 includes a pair of heat rollers 51 and 52 that are pressed against each other under a given pressure in relative positions such that they vertically hold the recording sheet P delivered thereto by the conveyor mechanism 20. Each of the heat rollers 51 and 52 contains therein a heater (not shown) for heating its surface to a given temperature.

The recording sheet P is passed between the heat rollers 51 and 52, the toner images of the individual colors, which are only put on the sheet P under the force of electric charge, are compressed by heating, and the superposed toner images are melted and permanently fixed to the sheet P. After the resulting color image is fixed, the recording sheet P is discharged onto a receiving tray 56 via exit rollers 54. Thereupon, a series of color image forming operations is finished.

The fixing unit 50 of the color copying machine described above requires a higher fixing temperature than a fixing unit of a monochrome copying machine. Outputting a monochrome image requires the surface temperature of the heat rollers to be set at about 130° C. In outputting a color image by melting superposed toner images of a plurality of colors, on the other hand, the surface temperature must be set at about 160° C.

Thus, in the color copying machine, metallic members that surround the fixing unit 50 are thermally expanded under the influence of heat from the fixing unit 50. In some cases, this heat expansion may cause image shifts.

According to the present embodiment, the distance between the fixing unit 50 and the driving roller 22 of the conveyor mechanism 20 that is located close to the fixing unit 50 is adjusted to about 50 mm, for example. The ambient temperature of a closed space around the fixing unit 50 is raised to approximately 60° C. in about 6 hours after the power is turned on. Accordingly, the surface temperature of the driving roller 22 is also increased to 60° C. or thereabout. If there is no obstacle between the fixing unit 50 and the roller 22, in particular, the surface temperature is increased to about 72° C., inevitably.

Here let it be supposed that austenitic stainless steel (SUS304) with the thermal expansion coefficient of $17.3\times10^{-6}$[1/K] is used as the material of the driving roller 22 and that the roller diameter at 25° C. (normal temperature) is Φ30 mm. In this case, the peripheral speed of the roller 22 can be adjusted to 100 mm/sec by setting the angular speed of the roller at 20/3 rad/sec. If the surface temperature of the driving roller 22 is raised, for example, from normal temperature to 60° C., as mentioned before, however, the roller diameter is inevitably increased by Φ30 mm$\times17.3\times10^{-6}$[1/K]×(60° C.−25° C.)≈0.02 mm. If the driving roller 22 is rotated with the increased roller diameter at the angular speed used before the increase of the roller diameter, the peripheral speed v of the roller becomes $v=r\times\omega=15.01\times20/3\approx100.067$ mm/sec, which is higher than the initial value by 67 μm/sec. In consequence, the traveling speed of the conveyor belt 21 increases, so that a speed difference is produced between the belt speed and the peripheral speed of the photoconductive drum, and the output image is inevitably subject to shifts.

The influence of the heat from the fixing unit 50 appears also as thermal expansion of the pair of metallic support plates 12 that support the respective rotating shafts of the four photoconductive drums 1Y, 1M, 1C and 1Bk, along with that of the driving roller 22, for rotation.

Let it be supposed that the respective rotating shafts of the photoconductive drums 1Y, 1M, 1C and 1Bk are supported by means of the support plates 12 that is formed of a cold-rolled steel plate (SPCC) with the thermal expansion coefficient of $11.6\times10^{-6}$[1/K] so that the distances between the respective axes of the drums are 80 mm at normal temperature (25° C.). In this case, the distance between the respective axes of each two adjacent drums is increased by 80 mm$\times11.6\times10^{-6}$[1/K]×(60−25)≈0.033 mm when the support plates 12 are heated to 60° C., the same level for the driving roller 22. Accordingly, the four photoconductive drums are subject to a shift of 0.033 mm×3=0.099 mm or about 99 μm in total. Thus, the respective transfer positions of the toner images in the image forming sections 10Y, 10M, 10C and 10Bk are shifted, so that the images are subject to color shifts, inevitably.

Further, the influence of the heat from the fixing unit 50 appears as thermal expansion and an angle shift of the aforesaid mirror holding member 36*a* that holds the reflector mirror 36 located close to each of the photoconductive drums 1Y, 1M, 1C and 1Bk.

If the mirror holding member 36*a* is deformed or inclined by thermal expansion, the mounting angle of the reflector mirror 36 is changed, and the position of application of the laser beam applied to the surface of each photoconductive drum, that is, exposure position, is shifted. If the exposure position is shifted in this manner, the distance from it to the transfer position changes, so that the output image is inevitably subject to color shifts. If the reflector mirror 36 undergoes an undesired inclination θ, in particular, the angle of deflection of the laser beam reflected by the mirror 36 is shifted by 2θ. Accordingly, the slightest inclination of the reflector mirror 36 can greatly influence the deflecting characteristics of the laser beam.

Since a beam spot is formed on the surface of each cylindrical photoconductive drum, moreover, its shape is changed undesirably if the position of exposure to the laser beam is shifted in the aforesaid manner.

If the mounting position of the reflector mirror 36 is changed by the thermal expansion of the mirror holding member 36*a* so that the optical path length of the laser beam is deviated from a designed value, moreover, the diameter of the beam spot in the exposure position on the drum surface cannot converge on a given value.

In the color copying machine described above, on the other hand, the metallic members may possibly be subjected to thermal expansion that is attributable to frictional heat between air and the polygon mirror 34 rotating at high speed, as well as to thermal expansion by the heat from the fixing unit 50.

Since the polygon mirror 36 is rotated at the high speed of about 20,000 to 25,000 rpm, as mentioned before, it is heated to approximately 100° C. by friction with air. If the mirror 34 is heated in this manner, the metallic lens holding member 35*a*, which holds the fθ-lens 35 incorporated together with the mirror 34 in one unit, is also heated.

When the polygon mirror 36 itself is heated, the scanning angle of the laser beam deflected by the mirror 34 is changed undesirably. Thereupon, the exposure position on the drum surface is shifted, so that the output image is inevitably subject to color shifts.

When the lens holding member 35*a* holding the fθ-lens 35 is heated, moreover, the position of the lens 35 changes. Accordingly, the spot diameter of the laser beam converged on the drum surface cannot be adjusted to a designed value, so that the necessary resolution cannot be obtained.

As described above, the metallic members that are arranged around the heating members, such as the fixing unit 50 and the polygon mirror 36 that generate undesired heat, are generally formed of a cold-rolled steel plate (SPCC) with the thermal expansion coefficient of 11 to $12\times10^{-6}$[1/K], austenitic stainless steel (SUS304) with the thermal expansion coefficient of 17 to $18\times10^{-6}$[1/K], or aluminum alloy with the thermal expansion coefficient of 19 to $23\times10^{-6}$[1/K]. If these metallic members are located in positions near the heating members such that thermal expansion is liable to occur, however, the aforesaid various problems are aroused.

According to the present embodiment, therefore, the following low-expansivity alloys with relatively low thermal expansion coefficients are used for the members described above.

Alloy Invar is a well-known example of low-expansivity alloys. The alloy Invar was discovered by Guillaume of France in 1896. It has long been used in standard measures, sensors, bimetals, precision measurers, etc. This alloy, which is an Ni—Fe alloy containing 34 to 36% of Ni, is poor in cutting ability. The Invar has a relatively low thermal expansion coefficient of 1 to $2\times10^{-6}$[1/K]. As Ni is added to Fe, the thermal expansion coefficient of the resulting alloy lowers. The alloy exhibits the lowest thermal expansion coefficient when it contains 34 to 36% of Ni. If more Ni is added to the alloy, the thermal expansion coefficient increases.

Dr. Masumoto of Japan discovered Super-Invar, which can be obtained by adding Co to the aforesaid Invar to improve its cutting ability. This material failed to enjoy wide practical use due to its high cost.

In 1927, moreover, INCO, a U.S. company, developed niresist cast iron (minovar cast iron) as an austenitic cast iron based on the composition of the Invar. This material is an Fe—Ni—C—Si alloy, which has various excellent properties, including corrosion resistance, wear resistance, brittle resistance at low temperature, heat resistance, etc. Therefore, this alloy was standardized in many countries and is widely used in various fields, such as chemical industry, food industry, etc. However, the thermal expansion coefficient of the niresist varies depending on the grade, ranging from 5 to $19\times10^{-6}$[1/K], which is higher than that of the Invar.

An Fe—N—C—Si alloy was developed as a cast iron that combines the advantages of the Super-Invar and the niresist cast iron. This cast iron has the thermal expansion coefficient of 1 to $3\times10^{-6}$[1/K] and enjoys high cutting ability. This alloy is marketed in the trade name of Nobinite. Shinichi Enomoto, a developer, obtained a patent for the cast iron of this composition in 1977.

According to the present embodiment, the Nobinite is used for the metallic members that are located in the aforesaid positions in which thermal expansion easily occurs. More specifically, the Nobinite is used for the driving roller 22 of the conveyor mechanism 20, support plates 12 supporting the rotating shafts of the photoconductive drums, polygon mirror 34 for deflecting the laser beam, mirror holding member 36*a* holding the reflector mirror 36, and lens holding member 35*a* holding the fθ-lens 35. The following is an examination of the properties of the individual members for which the Nobinite is used.

If the driving roller 22 of the conveyor mechanism 20 is formed of the Nobinite with the thermal expansion coefficient of $3\times10^{-6}$[1/K], the roller diameter, which is Φ30 mm at normal temperature (25° C.), for example, is increased by Φ30 mm$\times3\times10^{-6}$[1/K]×(60° C.–25° C.)≈0.03 mm. If the driving roller 22 is rotated with the increased diameter at the same angular speed of 20/3 rad/sec for normal temperature, its peripheral speed changes from 100 mm/sec to $v=r\times\omega=15.0015\times20/3\approx100.01$ mm/sec.

Thus, if the driving roller 22 is formed of the Nobinite, it undergoes only thermal expansion such that its peripheral speed is increased by about 10 μm when it is heated to 60° C. Therefore, the color shifts caused by the thermal expansion are 10 μm or thereabout. In consideration of the color toner particle diameter of 9 to 10 μm, the color shifts to this extent can be concluded to be within the range of a permissible error.

As the driving roller 22 is thus formed of the Nobinite, the color shifts attributable to thermal expansion can be restricted within the error range to ensure satisfactory image output by only changing the roller material without modifying the apparatus configuration.

If the support plates 12 that support the respective rotating shafts of the photoconductive drums 1Y, 1M, 1C and 1Bk are formed of the Nobinite with the thermal expansion coefficient of $3\times10^{-6}$[1/K], the distances between the respective axes of the drums, which are 80 mm at normal temperature (25° C.), are increased by 80 mm$\times3\times10^{-6}$[1/K]×(60° C.–25° C.)≈0.008 mm. Thus, each support plate 12 is lengthened by 0.008 mm×3=0.024 mm for the four photoconductive drums in total.

This elongation (24 μm) is about ¼ of the elongation (99 μm) for the case where the support plates 12 are formed of the aforesaid cold-rolled steel plate (SPCC), and the color shifts attributable to thermal expansion can be restricted to about ¼ by only changing the material of the plates 12 into the Nobinite. Thus, by forming the support plates 12 of the Nobinite, the color shifts attributable to thermal expansion of the plates 12 can be restrained considerably, so that an image of good quality can be outputted.

In the case where the mirror holding member 36*a* that holds the reflector mirror 36 is a block of 15-mm thickness (normal temperature) that is formed of an aluminum alloy with a relatively high thermal expansion coefficient (19 to $23\times10^{-6}$[1/K]), its thickness is increased by at least 15 mm$\times19\times10^{-6}$[1/K]$\times$(60° C.–25° C.)≈0.01 mm so that the reflective surface of the mirror 36 is moved by 0.01 mm when the holding member 36*a* is heated from normal temperature (25° C.) to 60° C. by the heat from fixing unit 50. If the reflective surface is moved in this manner, the optical path of the laser beam incident thereon is shortened (or lengthened), and that of the laser beam reflected by the reflective surface is also shortened (or lengthened) by the same margin. Thus, the optical path length is changed by a margin twice the distance of movement of the reflective surface.

Since each of the image forming sections 10Y, 10M, 10C and 10Bk has three reflector mirrors, the sum total of the respective optical path lengths of the three reflector mirrors is reduce by 0.01×2×3=0.06 mm if the mirrors are moved in a direction such as to shorten their optical paths. Thus, if the optical path of the laser beam is shortened, the focal position of the laser beam moves back by 0.06 mm, so that a desired spot cannot be formed.

If the holding member for each reflector mirror is formed of the Nobinite with the thermal expansion coefficient of $3\times10^{-6}$[1/K], on the other hand, the mirror holding member 36*a* is increased in thickness by 15 mm$\times3\times10^{-6}$[1/K]$\times$(60° C.–25° C.)≈0.0016 mm when it is heated to 60° C. Accordingly, the sum total of the respective optical path lengths of the three reflector mirrors is reduce by 0.0016×2×3=0.0096 mm.

Thus, by forming the holding member 36*a* for each reflector mirror 36 of the Nobinite, the optical path length of the laser beam can be shortened by about 10 μm at the maximum under the influence of the heat from the fixing unit 50. Since the change of the optical path length to this extent exerts no influence on the beam spot, however, the image can be outputted without any problem.

On the other hand, the member may possibly undergo thermal expansion attributable to heat from the polygon mirror 34 as well as the thermal expansion by the heat from the fixing unit 50.

In the case where the polygon mirror 34 for deflecting the laser beam is formed of an aluminum alloy with a relatively high thermal expansion coefficient (19 to $23\times10^{-6}$[1/K]) with the diameter of its inscribed circle adjusted to Φ70 mm, the mirror 34, which is rotated at the high speed of about 20,000 rpm, is heated from normal temperature (25° C.) to about 100° C. by friction with air. Accordingly, the diameter of the inscribed circle of the mirror 34 is increased by at least 70 mm$\times19\times10^{-6}$[1/K]$\times$(100° C.–25° C.)≈0.1 mm. Thus, each reflective surface of the polygon mirror 34 is moved away from the axis of rotation by 0.05 mm at a time.

When each reflective surface is moved in this manner by the thermal expansion of the polygon mirror 34, the optical path of the laser beam reflected by the reflective surface is shortened by 0.05×2=0.1 mm, and the diameter of the beam spot that is formed on the drum surface as the mirror 34 is scanned fails to be adjusted to the designed value.

If the polygon mirror 34 is formed of the Nobinite with the thermal expansion coefficient of $3\times10^{-6}$[1/K], on the other hand, the diameter of its inscribed circle is increased by 70 mm$\times3\times10^{-6}$[1/K]$\times$(100° C.–25° C.)≈0.016 mm even when the mirror 34 is heated to 100° C. Thus, each reflective surface of the mirror 34 is moved by 0.008 mm, so that the optical path of the laser beam is shortened by 0.016 mm. Since the change of the optical path length to this extent exerts no influence on the laser beam spot diameter, however, the image can be outputted without any problem.

In the case where the lens holding member 35*a* that holds the fθ-lens 35 is a block of 25-mm thickness (normal temperature) that is formed of an aluminum alloy with a relatively high thermal expansion coefficient (19 to $23\times10^{-6}$[1/K]), its thickness is increased by at least 25 mm$\times19\times10^{-6}$[1/K]$\times$(100° C.–25° C.)≈0.04 mm as the polygon mirror 34 is heated from normal temperature (25° C.) to 100° C.

The fθ-lens 35 serves to make the beam diameter in the laser beam exposure position uniform and straighten the laser scanning. If the lens holding member 35*a* is expanded to 0.04 mm by heat, as mentioned before, the laser beam ceases to be incident on the center of the fθ-lens 35, so that the lens 35 cannot function normally.

If the holding member 35*a* for the fθ-lens 35 is formed of the Nobinite with the thermal expansion coefficient of $3\times10^{-6}$[1/K], on the other hand, it is increased in thickness by 25 mm$\times3\times10^{-6}$[1/K]$\times$(100° C.–25° C.)≈0.0056 mm when it is heated to 100° C. However, the expansion of the holding member 35*a* to this extent never spoils the function of the fθ-lens 35.

As described above, the members that may possibly suffer thermal expansion in the copying machine, that is, the driving roller 22, support plates 12, polygon mirror 34, lens holding member 35*a*, and mirror holding member 36*a*, are formed of the Nobinite with a low thermal expansion coefficient. By doing this, thermal expansion of the members can be restrained, so that color shifts of the output image, which are attributable to thermal expansion, can be prevented to ensure the formation of a high-quality image.

Since the Nobinite, the material for the aforesaid members, easily rusts, it is advisable to plate its exposed surface with hard chrome.

Figure 3:
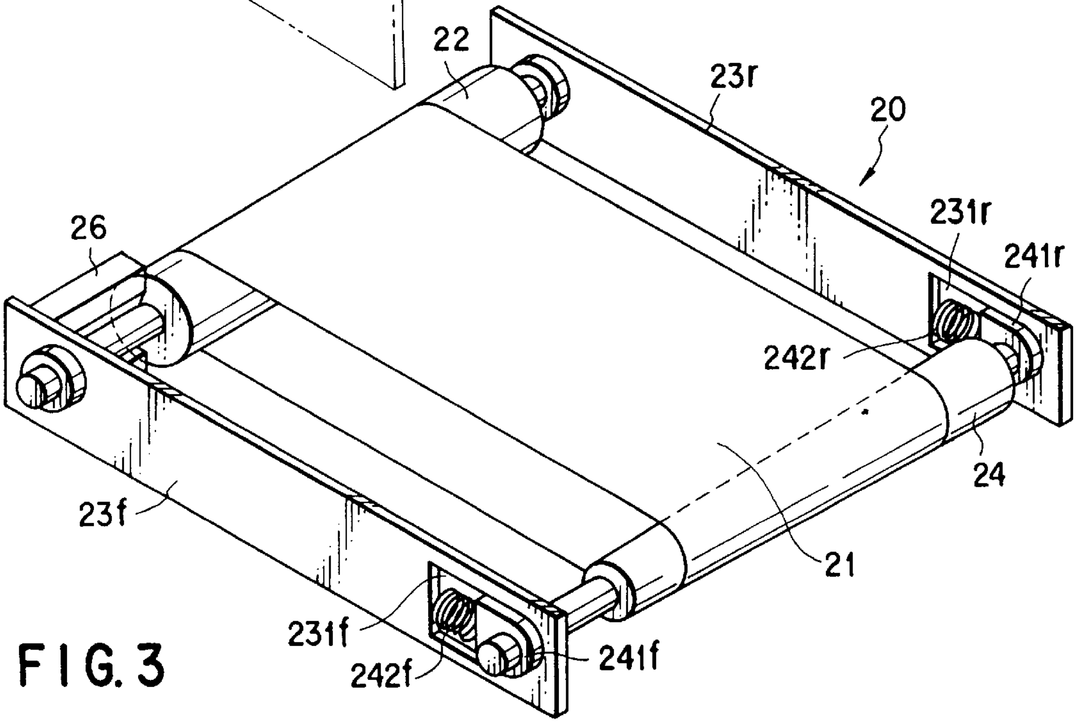
FIG. 3 is a perspective view schematically showing a conveying mechanism incorporated in the copying machine of FIG. 1.
Figure 4:
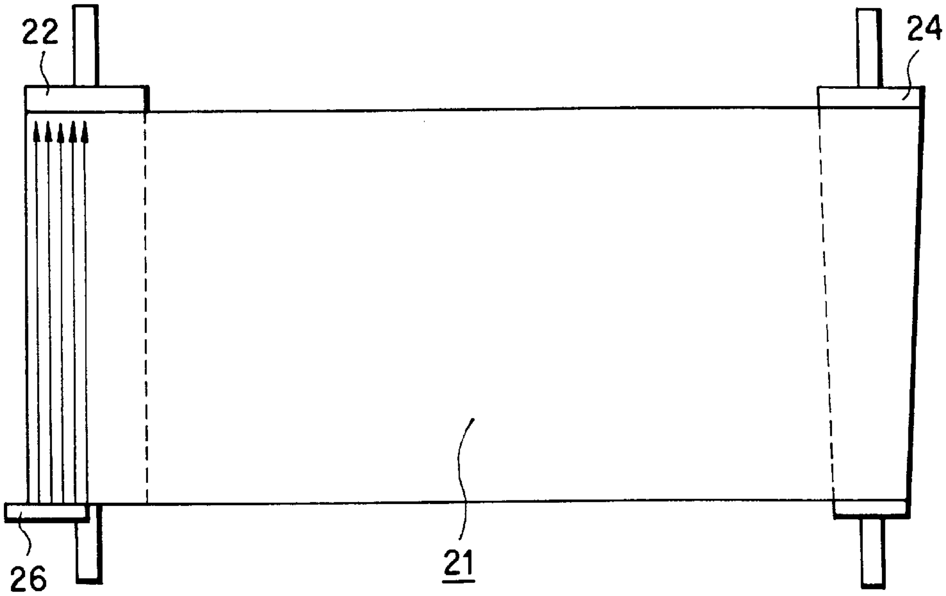
FIG. 4 is a plan view schematically showing the conveying mechanism of FIG. 3.
Figure 5:
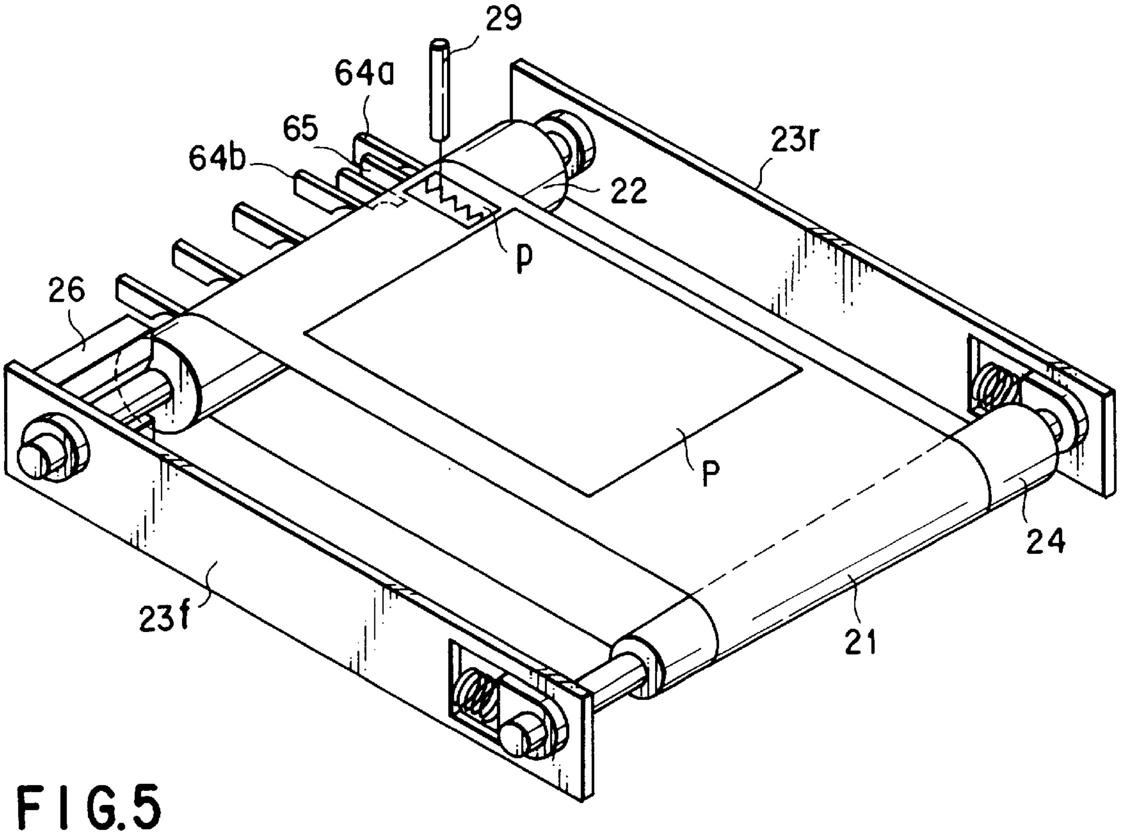
FIG. 5 is a perspective view of the conveying mechanism loaded with a slip for forming pattern images.

Referring now to FIGS. 3 and 4, the conveyor mechanism 20, a belt conveyor system according to the present invention, will be described in detail.

As shown in FIG. 3, the conveyor mechanism 20 includes the driving roller 22 and the driven roller 24, which are spaced and extend substantially parallel to one another. The endless conveyor belt 21 is passed around and stretched between the rollers 22 and 24.

The front and rear end portions of the respective rotating shafts of the rollers 22 and 24 are supported by means of a pair of substantially rectangular frames 23*f* and 23*r*, respectively. The opposite ends of the rotating shaft of the driven roller 24 are attached to the frames 23*f* and 23*r* by means of bridge members 241*f* and 241*r*, individually. The frames 23*f* and 23*r* are formed having slide holes 231*f* and 231*r* in which the members 241*f* and 241*r* are slidably fitted for substantially horizontal movement, respectively. The bridge members 241*f* and 241*r* are fitted with springs 242*f* and 242*r*, respectively, for urging the driven roller 24 to move away from the driving roller 22.

In this conveyor mechanism 20, it is essential to run the conveyor belt 21 steadily in its regular traveling position and to keep the conveying surface of the belt 21, which is in rolling contact with the photoconductive drums 1Y, 1M, 1C and 1Bk, substantially horizontal. To attain this, one of the rollers wound with the conveyor belt 21, e.g., the driven roller 24, is tapered toward the front side of the system from the rear side, and a block-shaped regulating member 26 for restricting the front end side of the belt 21 to a given position is located close to the front end portion the other roller or the driving roller 22.

The regulating member 26 is situated between the front end portion of the driving roller 22 and the front-side frame 23*f* and fixed to the frame 23*f*. As it comes into sliding contact with the end side of the conveyor belt 21, it regulates the traveling position of the belt 21. Thus, the tapered driven roller 24 causes the belt 21 to slide toward the front side, while the regulating member 26 holds the front end side of the belt 21. As this is done, the conveyor belt 21 can travel in its regular position without meandering.

If driven roller 24 is thus tapered, the conveying surface of the conveyor belt 21 cannot be level when the driving and driven rollers 22 and 24 are arranged so that their respective axes of rotation extend parallel to each other. Therefore, the smaller-diameter front end portion of the driven roller 24 is slightly lifted above the level position.

If the regulating member 26 is located in contact with the front end portion of the driving roller 22, a reaction force is produced on the rear end side of the conveyor belt 21 when the front end side of the belt 21 is pressed against the regulating member 26. This reaction force causes the belt 21 to be twisted near its rear end side, so that the rear end side is lifted. If the belt 21 is lifted in this manner, it cannot make good contact with the photoconductive drums, thus failing to ensure satisfactory transfer.

According to the present embodiment, therefore, the regulating member 26, which is located in contact with the front end portion of the driving roller 22, is given the shape shown in FIGS. 3 and 4. More specifically, the regulating member 26 can touch the end side of the conveyor belt 21 only in the region where the belt 21 is in contact with (or is passed around) the surface of the driving roller 22. In other words, the member 26 is prevented from touching any of regions in which the conveyor belt 21 is not in contact with the driving roller 22. When the front end side of the belt 21 is pressed against the regulating member 26, therefore, its reaction force is produced only in the direction indicated by arrows in FIG. 4, that is, in the direction along the axis of the driving roller 22. Thus, no reaction force is produced on the rear end side of the belt 21, and the belt 21 can be prevented from being lifted by twisting, so that satisfactory transfer properties can be obtained.

The following is a description of an arrangement for correcting color shifts of images and adjusting the image density, in the color copying machine described above, and the operation thereof.

In correcting color shifts of an image, in general, pattern images of their own colors are formed on the conveyor belt 21, and color shifts are detected by detecting shifts between these pattern images. These results of detection are fed back individually to the image forming sections 10Y, 10M, 10C and 10Bk, and the output positions of the individual color images are adjusted to correct the color shifts. In adjusting the image density, moreover, the image density is detected from the pattern images of the individual colors, and the results of detection are fed back to the image forming sections 10Y, 10M, 10C and 10Bk.

The pattern images of the individual colors are formed between the continuously fed recording sheets P in a manner such that they are arranged at regular intervals in a line along the traveling direction (sub-scanning direction) of the conveyor belt 21, in the position close to the rear end portion of the belt 21, for example. Each pattern image is substantially in the form of a V that is composed of a first segment, which extends in the width direction (main scanning direction) of the belt at right angles to the sub-scanning direction, and a second segment extending obliquely at a given angle from one end of the first segment.

The pattern image of each color formed in this manner is detected by means of a sensor 29, which is located over and at a given distance from the driving roller 22 that is wound with the conveyor belt 21. The sensor 29 is positioned so that its image detecting position passes through the center of the pattern image of each image normally formed in each of the image forming sections 10Y, 10M, 10C and 10Bk.

In the sensor 29 for detecting the pattern images, a plurality of optical fibers for irradiation are arranged around a light receiving optical fiber, and a condensing lens is attached to its distal end portion in which the light receiving optical fiber faces the conveyor belt 21. A light source is connected to the optical fibers for irradiation, while a light quantity detector is connected to the light receiving optical fiber.

Light is applied to the conveying surface of the conveyor belt 21 through the optical fibers for irradiation, and the reflected light from the conveying surface is received through the condensing lens and the light receiving optical fiber. Thus, the sensor 29 identifies the pattern images by the change of the quantity of received light.

The pattern images formed on the conveyor belt 21 in the aforesaid manner are removed by means of the belt cleaner 27 shown in FIG. 1 after they are detected by the sensor 29.

The following is a description of color shift correction. The pattern images of their own colors are successively formed on the conveyor belt 21 in the order of yellow, magenta, cyan, and black. Therefore, the colors of the pattern images can be specified according to the order of detection, so that the color shifts can be detected by only detecting the shifts of the pattern images. Thus, the sensor 29 must only be able to detect print and non-print portions in a binary fashion, and may be formed of a light quantity sensor, such as the aforesaid one, which detects the change of the quantity of reflected light.

Since each pattern image detected by the sensor 29 the first segment extending in the main scanning direction and the oblique second segment, the change of the reflected light quantity is detected twice for each pattern image. Thus, the shift of each pattern image in the main scanning direction can be detected by comparing the time interval between the two changes of the reflected light quantity with a given value. If the interval between the changes of the reflected light quantity is greater than the given value, it can be concluded that the pattern image is shifted toward the point of intersection of the first and second segments.

The shift of each pattern image in the sub-scanning direction can be detected by continuously forming pattern images twice or more at regular intervals for each color and comparing the intervals between the respective first segments of the individual pattern images, for example.

Thus, the color shifts of the output image can be corrected by feeding back the shifts in the main and sub-scanning directions to the photoconductive drums 1Y, 1M, 1C and 1Bk. For example, the image shift in the sub-scanning direction can be corrected by only adjusting the respective rotational speeds of the photoconductive drums 1Y, 1M, 1C and 1Bk or the traveling speed of the conveyor belt 21.

According to this method in which the pattern images printed directly on the conveyor belt 21 are detected by means of the sensor 29, however, the pattern images are identified by the differences in the quantity of reflected light between the print and nonprint portions of the images. If the signal-to-noise ratio of the detected change of the light quantity is lowered by deterioration of the conveyor belt 21 or from any other cause, therefore, the differences in the reflected light quantity cannot be detected accurately. Thus, if the pattern images cannot be detected accurately, the color shifts cannot be corrected normally and cause formation of defective images.

Possibly, the conveyor belt 21 may deteriorate in the following manner. Paper dust produced during the transportation of the recording sheets P adheres to the belt 21 and is removed by means of the belt cleaner 27. As tens of thousands of recording sheets P are passed along the belt 21, the surface of the belt is damaged inevitably.

According to the present embodiment, therefore, a slip p on which only pattern image are to be printed is passed through a pattern printing position, in which the pattern images are formed, and a pattern reading position, in which the pattern images are read, in a non-image forming region between the recording sheets P, and the pattern images are printed on the slip p. Thus, the pattern images can be accurately detected without lowering the signal-to-noise ratio of the reflected light quantity, and formation of defective images attributable to failure in the pattern image detection can be prevented securely.

As shown in FIG. 1, a plurality of slips p are stacked in layers in a casing 61. Each slip p has a width of 15 mm and a length of 50 mm in the conveying direction. Thus, it is necessary only that each slip p be large enough to carry the pattern images thereon. The slips p stored in the casing 61 are taken out by means of a pickup roller 62, the top one first. Then, the slips p are fed onto the conveyor belt 21 through a pair of feed rollers 63 and the aligning rollers 45. The members for feeding these slips p are positioned so that the slips p on the belt 21 pass through the predetermined pattern printing and reading positions in which they are located close to the rear side of the belt 21.

The pattern images on the slips p passed through the pattern reading position are then read by the sensor 29, and are separated from the conveyor belt 21 by means of a pair of second separating claws 65. On the conveying surface of the belt 21 passed around the driving roller 22, first separating claws 64 for separating the recording sheets P for normal image printing are arranged at intervals of about 20 mm along the axis of the roller 22. The second separating claws 65 are located between the rearmost first separating claw 64*a* and another first separating claw 64*b* that is situated next to or directly inside the claw 64*a*.

The first separating claws 64 are located substantially on the same height level as the conveying surface of the conveyor belt 21, while the second separating claws 65 are situated just on the downstream side of and below the first claws 64 (see FIG. 1). Therefore, each slip p having passed the pattern reading position is passed between the first separating claws 64, and is separated from the belt 21 by means of the second separating claws 65. On the other hand, each recording sheet P for the image output has a width at least greater than the distance between each two adjacent first separating claws 64, so that it is separated by the first claws 64 and guided to the fixing unit 50.

Each slip p separated from the conveyor belt 21 by means of the second separating claws 65 is discharged into a storage casing 66, which is located under the second claws 65 and between the driving roller 22 and the fixing unit 50, with the pattern images only transferred thereto and unfixed. The slips p collected in the casing 66 are recovered by a serviceman. The casing 61 is replenished periodically with the slips p by the serviceman.

As the pattern images are thus formed on the slip p that is fed independently of the recording sheet P, the pattern images can always be formed on a new slip p without being printed directly on the conveying surface of the conveyor belt 21. Thus, the signal-to-noise ratio of the pattern images cannot be lowered, so that the pattern images can be detected accurately. In consequence, the correction of image shifts and adjustment of the image density can be securely effected to ensure the formation of a high-quality image.

The following is a description of a method for determining the exhaustion of the conveyor belt 21.

Normally, the exhaustion of the conveyor belt 21 is determined when a predetermined number is exceeded by the count number of fed recording sheets P. Since the fed sheets P are not fixed in size and thickness, however, the exhaustion sometimes cannot be accurately determined by the count number.

The conveyor belt 21 is damaged by paper dust that is produced as the recording sheets P are fed, and its quality is lowered after tens of thousands of recording sheets P are processed. Thus, the exhaustion of the belt 21 should be determined when a certain limit is exceeded by the depth of minute flaws in the belt surface.

If the flaws in the belt surface deepen, the pressure resistance of the flawed portions of the belt lowers, so that leakage is caused by transfer voltages applied by the transfer rollers 5Y, 5M, 5C and 5Bk. This leakage is electrical discharge that is caused between the transfer rollers and the photoconductive drums in the belt regions with the lowered pressure resistance.

If the leakage is caused, pinholes are formed in the affected belt regions by heat attributable to the electrical discharge. Once the pinholes are generated, the leakage occurs every time the belt travels, and the pinholes gradually become greater. Further, the leakage through the pinholes destroys the photosensitive surfaces of the photoconductive drums, thus resulting in image dislocation and the like.

Furthermore, such undesired leakage produces mischievous noises in the copying machine. These leakage noises influence the on-off operation for control signals for the apparatus, thereby causing wrong operation of the apparatus. Once the leakage noises, which are irregular, are generated, the apparatus itself ceases to function.

According to the present embodiment, the surface conditions of the conveyor belt 21 are monitored by means of the sensor 29, and the exhaustion of the belt is determined by the level of flaws in the belt surface.

Thus, in an initial state such that the conveyor belt 21 has no flaws in its surface, the light from the sensor 29 applied to the belt surface is reflected substantially totally. As flaws in the surface of the belt 21 increase with the passage of the recording sheets P, on the other hand, the light is scattered in the flawed regions, so that the quantity of reflected light lessens. Accordingly, the exhaustion of the belt 21 is determined by monitoring the reduced light quantity.

The following is a description of a sequence for determining the exhaustion of the conveyor belt 21. This sequence is started when a start button of the copying machine is depressed. Since the belt 21 is expected to be replaced with every passage of tens of thousands of recording sheets, its surface conditions need not be monitored during copying operation.

When the start button of the copying machine is depressed, entry of a signal from the sensor 29 is awaited, and the conveyor belt 21 stands ready to be driven. When the belt 21 starts to be driven, the quantity of reflected light received by the sensor 29 is written in a memory (not shown). The recording sheet P conveyed by the conveyor belt 21 is brought to a position just short of the sensor 29, and the quantity of reflected light obtained so far is stored in the memory. Whether or not the position of the sensor 29 is reached by the sheet P is determined by counting rotation control pulses for the driving roller 22 of the conveyor belt 21.

When the recording sheet P reaches the sensor 29, the reflected light quantity stored in the memory is leveled, and whether or not the resulting mean value is smaller than a reference value preset in the memory is determined.

If the mean value is found to be greater than the reference value, it is concluded that the conveyor belt 21 need not be replaced, whereupon the sequence is finished.

If the mean value is found to be smaller than the reference value, on the other hand, it is concluded that the conveyor belt 21 must be replaced, and a replacement lamp (not shown) in the copying machine is lit. This lamp, which can be recognized by the serviceman only, is reset after the serviceman's recognition.

The reference value set in the memory is greater than the value of the serviceman's maintenance cycle interval by a certain margin. Even in the case where the timing for the replacement of the conveyor belt 21 is determined immediately after the completion of the serviceman's maintenance, therefore, leakage through the belt and any trouble involved therein cannot occur before the next maintenance cycle.

Thus, the exhaustion of the conveyor belt 21 can be accurately determined by timely detecting the surface conditions of the belt by means of the sensor 29, so that there is possibility of the occurrence of leakage through the belt or the production of defective images attributable to such leakage.

It is to be understood that the present invention is not limited to the embodiment described above, and that various changes and modifications may be effected therein by one skilled in the art without departing from the scope or spirit of the invention.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A belt conveyor system comprising:

a rotatable first roller having a first end and a second end;

a second roller having a first end and a second end, the second roller being tapered toward the first end thereof and being located substantially parallel to and at a distance from the first roller;

a conveyor belt passed around and stretched between the first and second rollers for endless traveling, the first ends of the first and second rollers disposed along one side of the conveyor belt and the second ends of the first and second rollers disposed along the other side of the conveyor belt; and a regulating member located at a position close to the first end of the first roller, the regulating member configured to be in sliding contact with an end side of the conveyor belt only in a region where the conveyor belt is in contact with the first roller.

2. A belt conveyor system as claimed in claim 1, further comprising a first frame supporting the first end of each of the first and second rollers and a second frame supporting the second end of each of the first and second rollers.

3. A belt conveyor system as claimed in claim 2, wherein the regulating member is fixed to the first frame.

4. A belt conveyor system as claimed in claim 1, wherein the first roller is a driving roller.

5. A belt conveyor system according to claim 1, wherein a reaction occurring when the regulating member slides on the end side of the conveyor belt acts on the conveyor belt along the first roller alone.

6. A belt running method for use in a belt conveyor system, the belt conveyor system comprising a first roller having a first end and a second end, a second roller having a first end and a second end, the second roller being tapered toward the first end thereof and being located substantially parallel to and at a distance from the first roller, a conveyor belt passed around and stretched between the first and second rollers where the first ends of the first and second rollers are disposed along one side of the conveyor belt and the second ends of the first and second rollers are disposed along the other side of the conveyor belt, and a regulating member located at a position close to the first end of the first roller, said method comprising the steps of:

rotating one of the first and second rollers to drive the conveyor belt in an endless path;

moving the conveyor belt toward the first ends of the first and second rollers in accordance with a tapered shape of the second roller; and permitting the regulating member to be in sliding contact with one end side of the conveyor belt only in a region where the conveyor belt is in contact with the first roller.

* * * * *